(12) United States Patent  
Palm (10) Patent No.: US 10,898,905 B2  
(45) Date of Patent: Jan. 26, 2021

(54) DECANTER BACK DRIVE SPEED CONTROL AND TORQUE MONITOR

(71) Applicant: Hutchison Hayes Separation Inc., Houston, TX (US)

(72) Inventor: Carl R. Palm, Kemah, TX (US)

(73) Assignee: HUTCHISON HAYES SEPARATION INC., Houston, TX (US)

( * ) Notice: Subject to any disclaimer, the term of this patent is extended or adjusted under 35 U.S.C. 154(b) by 784 days.

(21) Appl. No.: 15/493,809

(22) Filed: Apr. 21, 2017

(65) Prior Publication Data

US 2018/0304278 A1  Oct. 25, 2018

(51) Int. Cl.
*B04B 1/20* (2006.01)
*F16D 57/06* (2006.01)
*F16D 66/00* (2006.01)

(52) U.S. Cl.
CPC ............ *B04B 1/2016* (2013.01); *F16D 57/06* (2013.01); *F16D 2066/003* (2013.01)

(58) Field of Classification Search
CPC .. B04B 1/2016; F16D 2066/003; F16D 57/06
USPC ..................................................... 494/53, 84
See application file for complete search history.

(56) References Cited

U.S. PATENT DOCUMENTS

| 5,403,260 | A | 4/1995 | Hensley | |
|---|---|---|---|---|
| 5,948,271 | A * | 9/1999 | Wardwell | B04B 1/20 210/143 |
| 6,568,416 | B2 * | 5/2003 | Tucker | G05D 16/2053 137/14 |
| 2004/0138040 | A1 * | 7/2004 | Hensley | B04B 1/2016 494/53 |
| 2007/0203009 | A1 * | 8/2007 | Cunningham | F16H 61/4052 494/50 |
| 2014/0357464 | A1 | 12/2014 | Stone | |
| 2015/0361866 | A1 * | 12/2015 | Baldus | F01P 11/10 417/364 |
| 2017/0009783 | A1 * | 1/2017 | Mate | F04D 25/04 |

* cited by examiner

*Primary Examiner* — Walter D. Griffin  
*Assistant Examiner* — Shuyi S. Liu  
(74) *Attorney, Agent, or Firm* — Patterson + Sheridan, LLP (57) ABSTRACT

The present disclosure generally relates to a motor driven, high velocity decanter, and more particularly to a decanter which incorporates a horizontal rotating bowl and a rotating scroll. The decanter is capable of separating particulate material or solids from a liquid. A motor is coupled to and drives the bowl. Rotational power is transferred from the bowl to the scroll through a gearbox. An adjustable speed brake is coupled to the scroll to affect the differential speed between the bowl and the scroll. In one example, the adjustable speed brake is a positive displacement pump.

18 Claims, 7 Drawing Sheets

DECANTER BACK DRIVE SPEED CONTROL AND TORQUE MONITOR

BACKGROUND

Field

Embodiments of the present disclosure generally relate to separation systems employing decanters used for solid/liquid separation.

Description of the Related Art

A decanter is a centrifuge that separates solid materials from a liquid, and includes a rotating bowl and a rotating scroll, or screw conveyor, arranged within the bowl. The bowl and the scroll rotate at different speeds, such that solids are transported within the bowl via a differential speed between the bowl and the scroll. A conventional decanter fixes the rotation of a gearbox pinion shaft. This setup provides one differential speed between the bowl and the scroll. To optimize flow through the decanter the gearbox pinion shaft is rotated which changes the solids discharge rate. Existing technology that provides infinite variability between maximum and minimum pinion shaft rotational speed is complex and expensive.

Therefore, there is a need in the art for an improved separation system and method of controlling differential speed between a bowl and a scroll of a decanter.

SUMMARY

The present disclosure generally relates to a motor driven, high velocity decanter, and more particularly to a decanter which incorporates a horizontal rotating bowl and a rotating scroll. The decanter is capable of separating particulate material or solids from a liquid. A motor is coupled to and drives the bowl. Rotational power is transferred from the bowl to the scroll through a gearbox. An adjustable speed brake is coupled to the scroll to affect the differential speed between the bowl and the scroll. In one example, the adjustable speed brake is a positive displacement pump.

In one example, a separation system comprises a decanter comprising a bowl and scroll disposed within the bowl; a drive motor for rotating the bowl; a gearbox for transferring rotational motion of the bowl to the scroll; an adjustable speed brake coupled to the gearbox, the adjustable speed brake configured to move a fluid through a fluid system comprising a flow controller, wherein a rotational speed of the scroll is adjustable in response to a change of fluid flow through the flow controller.

In another example, a method of operating a separation system comprises driving a decanter with a drive motor, the drive motor driving a bowl of the decanter and a scroll of the decanter, the scroll being driven through a gearbox; and adjusting the differential speed between the bowl and the scroll, the adjusting comprising adjusting a flow rate of a fluid through a fluid system, the fluid driven by an adjustable speed brake coupled to the gearbox, wherein a rotational speed of the scroll is adjustable in response to a change of fluid flow through the flow controller.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to a motor driven, high velocity decanter, and more particularly to a decanter which incorporates a horizontal rotating bowl and a rotating scroll. The decanter is capable of separating particulate material or solids from a liquid. A motor is coupled to and drives the bowl. Rotational power is transferred from the bowl to the scroll through a gearbox. An adjustable speed brake is coupled to the scroll to affect the differential speed between the bowl and the scroll. In one example, the adjustable speed brake is a positive displacement pump.

Differential speed is the difference in speed between the bowl and scroll of the decanter. The differential speed is one variable which determines the length of time in which solid material remains in the decanter during a separation process. As slurry (or other feedstock) is provided to decanter, the composition of the slurry can vary over time. The ability to adjust differential speed in response to changes in slurry composition allows the solid/liquid separation of the slurry to be performed at an optimum level.

Figure 1A:
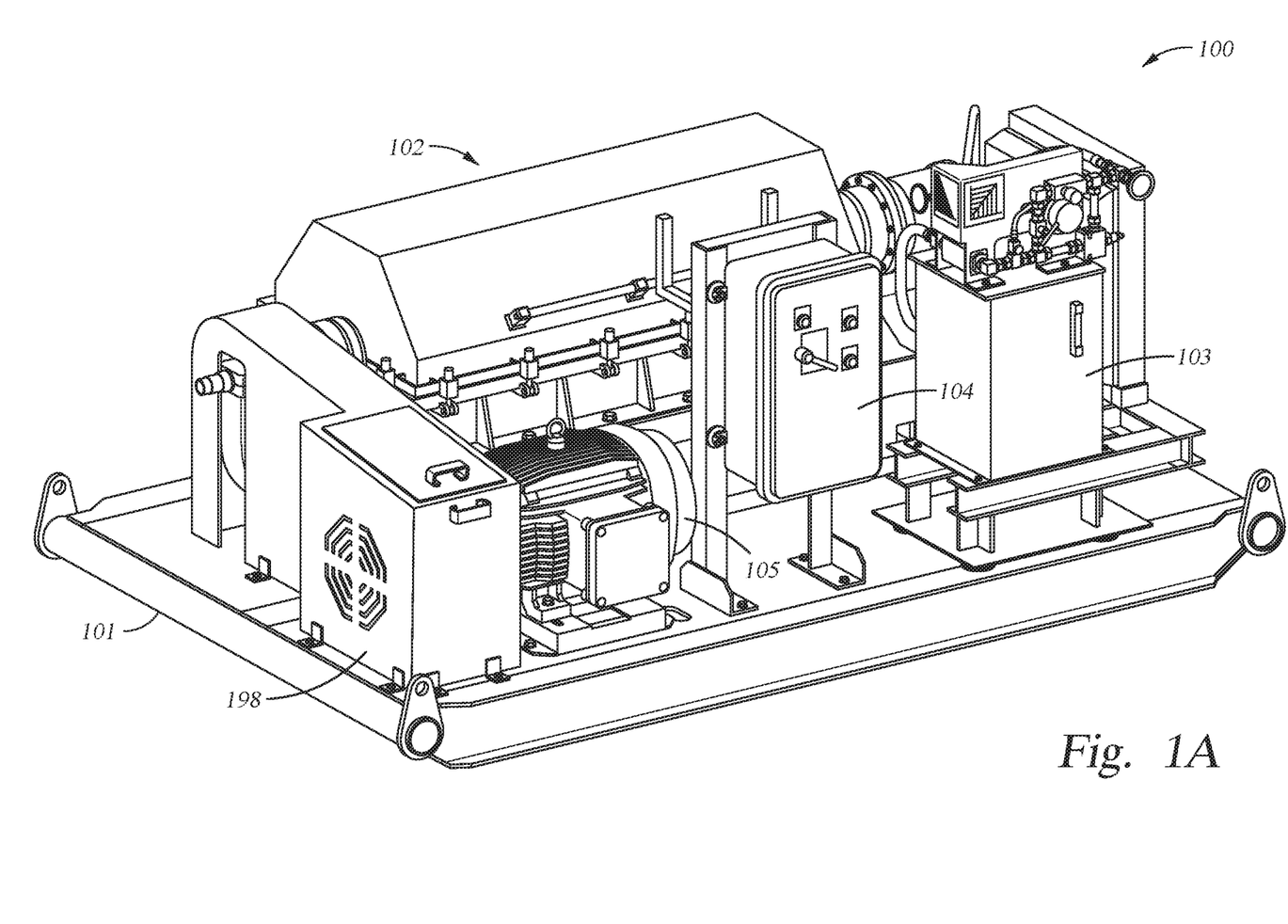
FIG. 1A is a schematic perspective view of a separation system, according to one aspect of the disclosure.
Figure 1B:
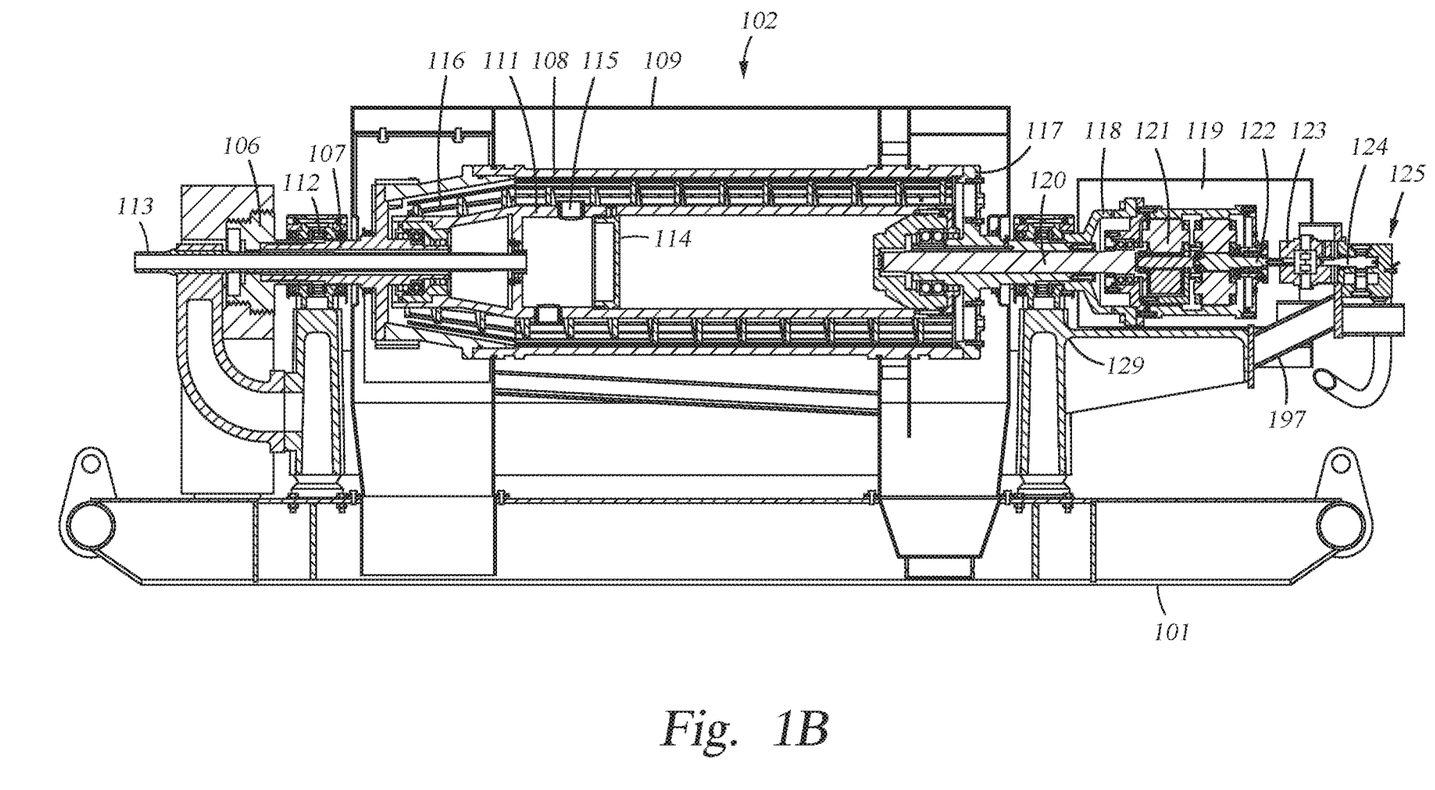
FIG. 1B is a schematic partial sectional view of the separation system shown in FIG. 1A.

FIG. 1A is a schematic perspective view of a separation system 100, according to one aspect of the disclosure. FIG. 1B is a schematic partial sectional view of the separation system 100 shown in FIG. 1A. Referring to FIG. 1A, the separation system 100 includes a skid 101, a decanter 102 disposed on the skid 101, and a fluid system 103 disposed on the skid 101 and coupled to the decanter 102. A control box 104 is disposed on the skid and electrically coupled to a drive motor 105 to selectively apply power to the drive motor 105.

Referring to FIG. 1B, the decanter 102 includes a cabinet 109 housing a bowl 108 and a scroll 111 therein. The drive motor 105 drives a belt (not shown) positioned beneath a cover 198, which in turn drives a dual-speed pulley 106. The dual-speed pulley 106 is connected to the tubular extension 107 of the bowl 108. The tubular extension 107 is supported via bearings 112 to facilitate rotation of the tubular extension 107 about a tubular slurry input 113. The tubular slurry input 113 remains stationary during actuation of the decanter 102 and facilities flow of slurry into the decanter 102 for separation. In one example, slurry is provided to an interior volume of the scroll 111. An isolation plate 114 partitions an internal volume of the scroll 111, and redirects slurry through one or more orifices 115 to a space 116 located between the scroll 111 and bowl 108 to facilitate separation of the slurry.

Rotation of the tubular extension 107 results in rotational movement of the bowl 108 about an axis of the tubular extension 107. Consequently, a rearward extension 117 of the bowl 108 is also rotated. The rearward extension 117 is connected to an external housing 118 of a gearbox 119, resulting in rotation of the external housing 118 when the rearward extension 117 is rotated. Rotational energy is transferred from the external housing 118 to a shaft 120 through a gear system 121. The ratio of the gear system 121 may be selected to provide a desired level of speed transfer between the bowl 108 and the scroll 111, and/or to provide a maximum differential speed between the bowl 108 and the scroll 111.

A pinion 122 is disposed coaxially with the shaft 120 and extends from the gearbox 119 opposite the shaft 120. The pinion 122 interacts with the gear system 121 at a first end thereof, and engages a coupling 123 at a second end thereof. The coupling 123 facilitates connection between the pinion 122 of the gearbox 119, and a pinion 124 of an adjustable speed brake 125. In one example, the adjustable speed brake 125 is a positive displacement pump. In such an example, the pinion 124 is fitted with a cog gear or integrally formed with gear teeth at a first end thereof. The first end of the pinion 124 is disposed within the adjustable speed brake 125, while a second end of the pinion 124 opposite the first end extends from adjustable speed brake 125 and engages the pinion 122 at the coupling 123. Rotation of the pinion 124, which correlates to the rotational speed of the adjustable speed brake 125, influences ratio of the gear system 121 thereby facilitating adjustment of the differential speed between the bowl 108 and the scroll 111.

Figure 1C:
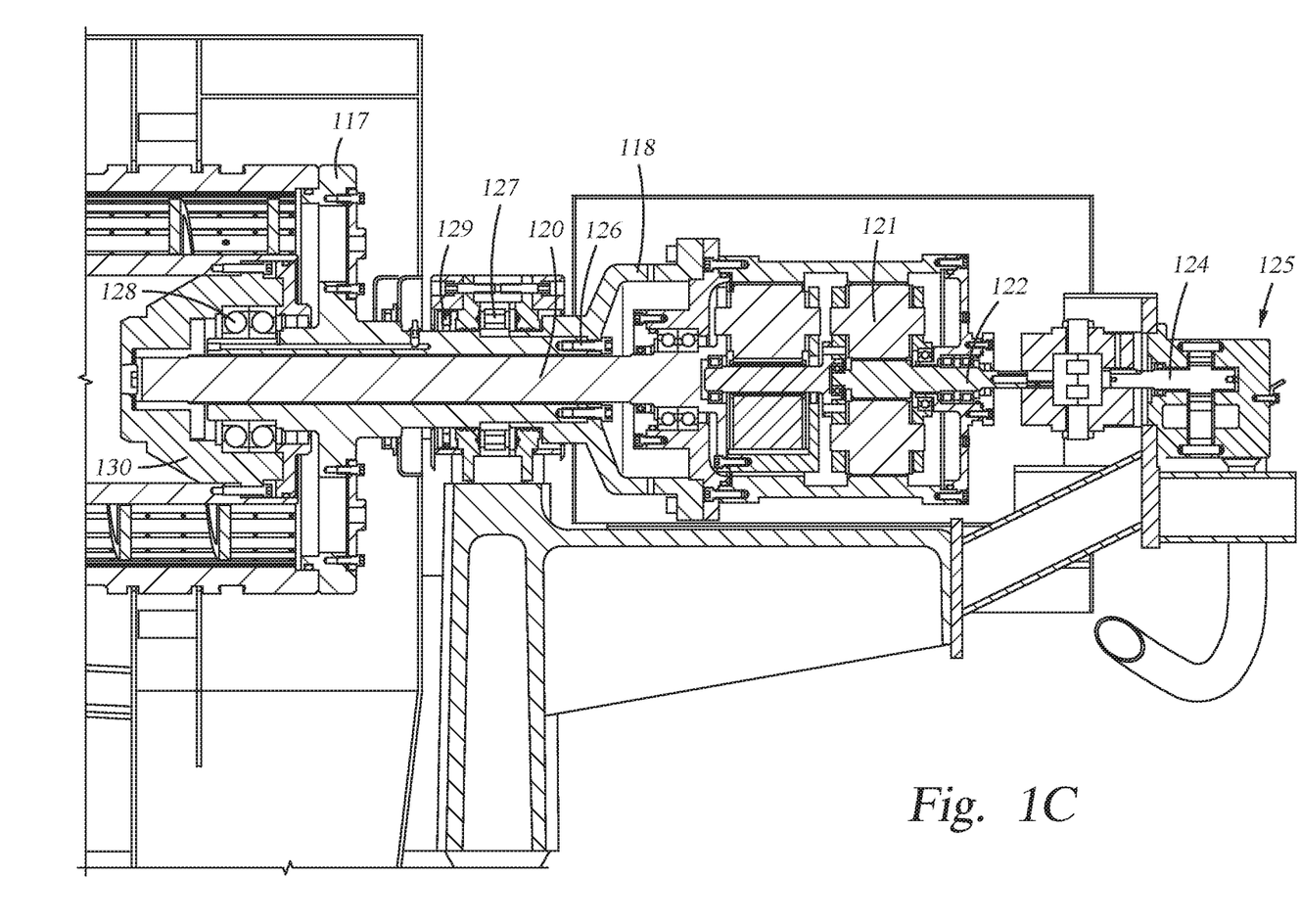
FIG. 1C illustrates an enlarged schematic partial view of FIG. 1B.

FIG. 1C illustrates an enlarged schematic partial view of FIG. 1B. As illustrated in FIG. 1C, the rearward extension 117 is coupled to the external housing 118 via one or more fasteners 126 (two are shown). Bearings 127 and 128 are disposed about the rearward extension 117 and facilitate rotation thereof. Bearing 128 facilitates independent rotation of the bowl 108 and the scroll 111. In one example, the bearings 127 are positioned between a fixed support structure 129 coupled to the skid 101, and facilitate rotational movement between the rearward extension 117 and the fixed support structure 129. Bearing 112 (shown in FIG. 1B) is positioned in a similar support structure at an opposite end of the decanter 102. The bearings 128 are positioned within the decanter 102 and facilitate relative movement between the bowl 108 and the scroll 111. In such an example, the bearings 128 are housed in within a bearing pack 130 located within and coupled to the scroll 111. Thus, the bearing pack 130 and the shaft 120 rotate with the scroll 111. A mounting bracket 197 is coupled to the support structure 129 to facilitate mounting of the adjustable speed brake 125. It is contemplated that the adjustable speed brake 125 and the mounting bracket 197 may be easily retrofitted to existed units.

FIGS. 2A-2D illustrate schematic views of a fluid system 103 according to one aspect of the disclosure. The fluid system 103 includes a reservoir 231, a speed control system 232 fluidly coupled to the reservoir 231, a heat exchanger 233, a supply line 234a for delivering fluid from the reservoir 231 to the adjustable speed brake 125, and a return line 234b to return fluid from the adjustable speed brake 125 to the reservoir 231. In such a configuration, the fluid system 103 is a closed system. One or more components of the fluid system 103 may be disposed on an optional support structure 235 to facilitate installation of the fluid system on to the skid 101 (shown in FIG. 1A). The optional support structure 235 is a frame defined by one or more I-beams or other structure components. In one example, the reservoir 231 and the heat exchanger 233 are mounted directly to the optional support structure 235.

Figure 2A:
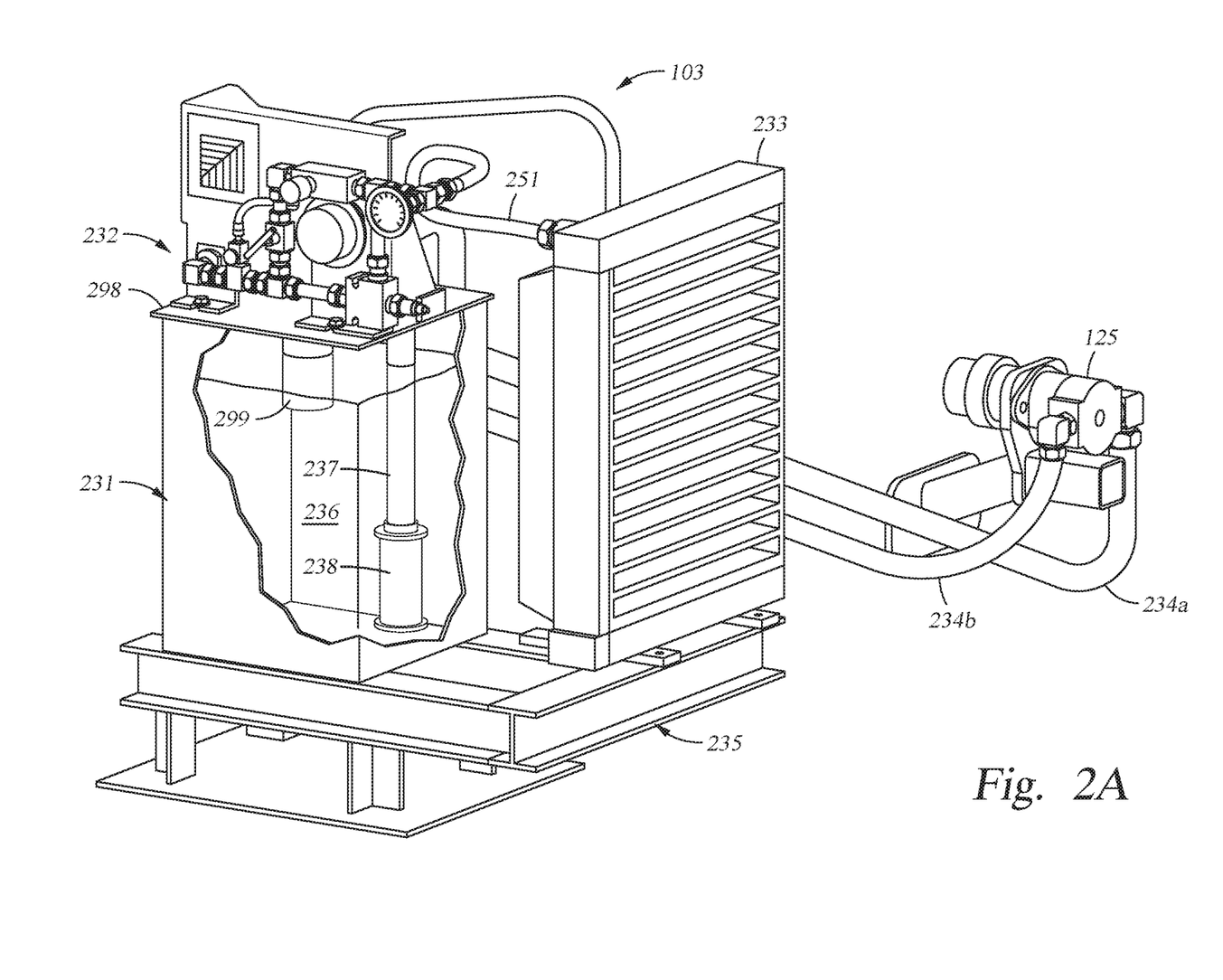
FIGS. 2A-2D illustrate schematic views of a fluid system according to one aspect of the disclosure.

The reservoir 231 is an enclosure for containing a volume of fluid 236, such as water, therein. An inlet tube 237 includes an optional filter 238 on a distal end thereof is positioned in the reservoir 231 and extends a sufficient distance to be submerged into the fluid 236. As discussed above, the adjustable speed brake 125 is coupled to the gearbox 119, and as the gearbox 119 is driven, so too is the adjustable speed brake 125. However, the adjustable speed brake 125 rotates at a different speed than the gearbox 119. Actuation of the pinion 124 of the adjustable speed brake 125 induces fluid flow within the fluid system 103. Specifically, fluid 236 is drawn through from the reservoir 231 through the filter 238 and the inlet tube 237. The inlet tube 237 is fluidly connected to the supply line 234a and supplies the fluid 236 thereto. The supply line 234a provides the fluid 236 to the adjustable speed brake 125. The fluid 236 exits the adjustable speed brake 125 and flows into the return line 234b which provides the fluid 236 to speed control system 232. Fluid 236 exiting the speed control system 232 is directed through the heat exchanger 233 before returning to the reservoir 231. Returned fluid may be provided to the reservoir 231 through a filter 299 disposed within the reservoir 231. In one example, the filter 299 is coupled to an underside of a lid 298 of the reservoir 231. The filter 299 facilitates removal of particles accumulated during flow through the fluid system 103.

In an unrestricted state, the volumetric flow through the adjustable speed brake 125 results in the bowl 108 and the scroll 111 rotating at the same speed. In such an example, the adjustable speed brake 125 moves a maximum volumetric flow determined by the internal positive displacement gearing of the adjustable speed brake 125. The volumetric flow of fluid 236 moved through the adjustable speed brake 125 is adjustable via the speed control system 232. Adjustments in the volumetric flow of fluid 236 via the speed control system 232 affect the rotational rate of the pinion 124 of the adjustable speed brake 125, and in response affect the rotational rate of the scroll 111 (shown in FIG. 1B). Thus, manipulation of the flow of fluid 236 through the fluid system 103 affects rotational rate of the scroll 111, and differential speed between the scroll 111 and the bowl 108.

As restriction to flow is applied via the speed control system 232 of the fluid system 103, the differential speed between the bowl 108 and the scroll 111 is increased due to reduction in rotational speed of the scroll 111. It is to be noted that restriction of the flow of fluid 236 generally does not affect the speed at which the bowl 108 rotates. It is also to be noted that the gear ratio of the gear system 121 may be selected to provide a desired differential speed between the bowl 108 and the scroll 111 when fluid flow is shut off. In such an example, the differential speed between the scroll 111 and the bowl 108 may be greater than zero.

Figure 2B:
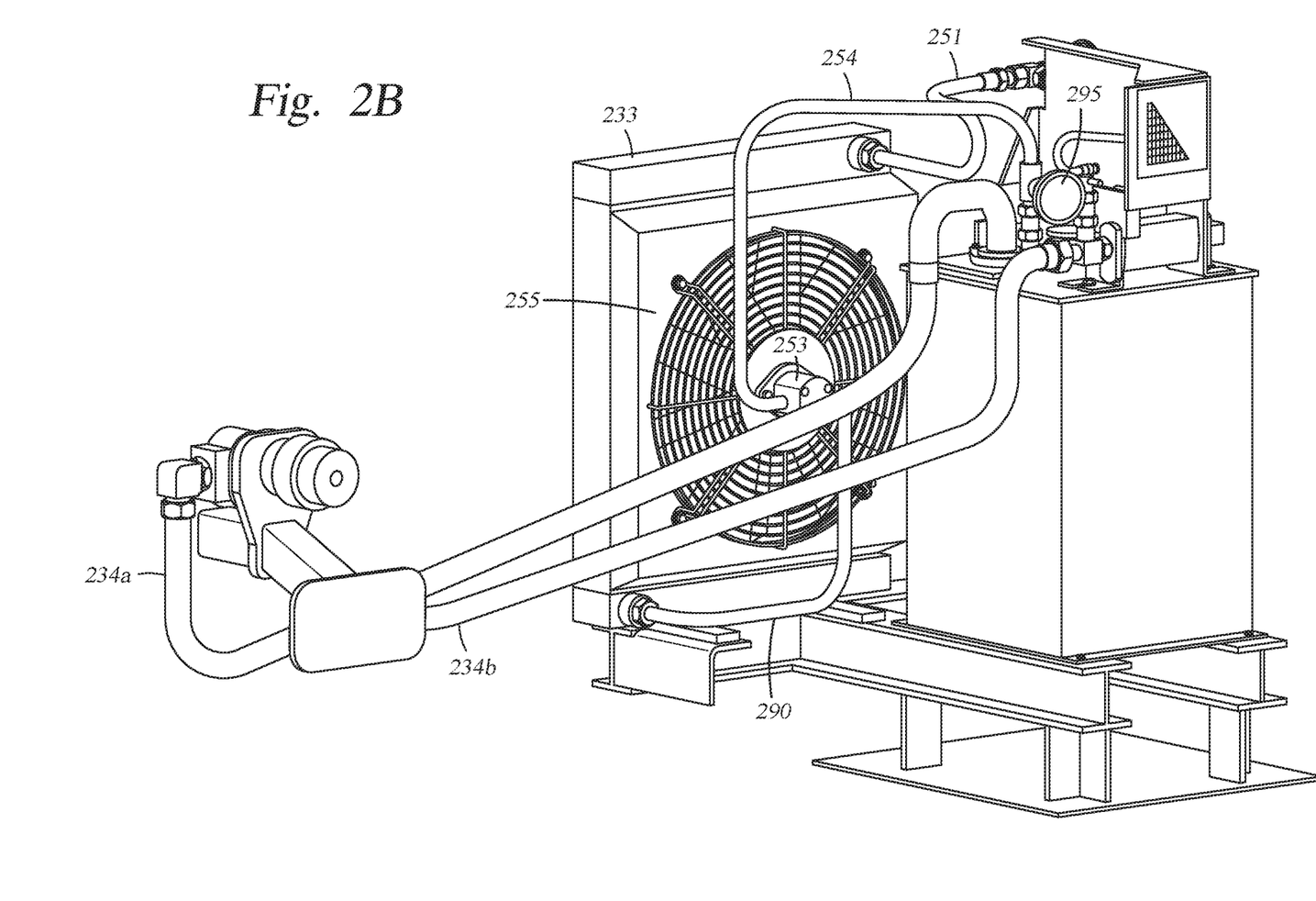
Figure 2C:
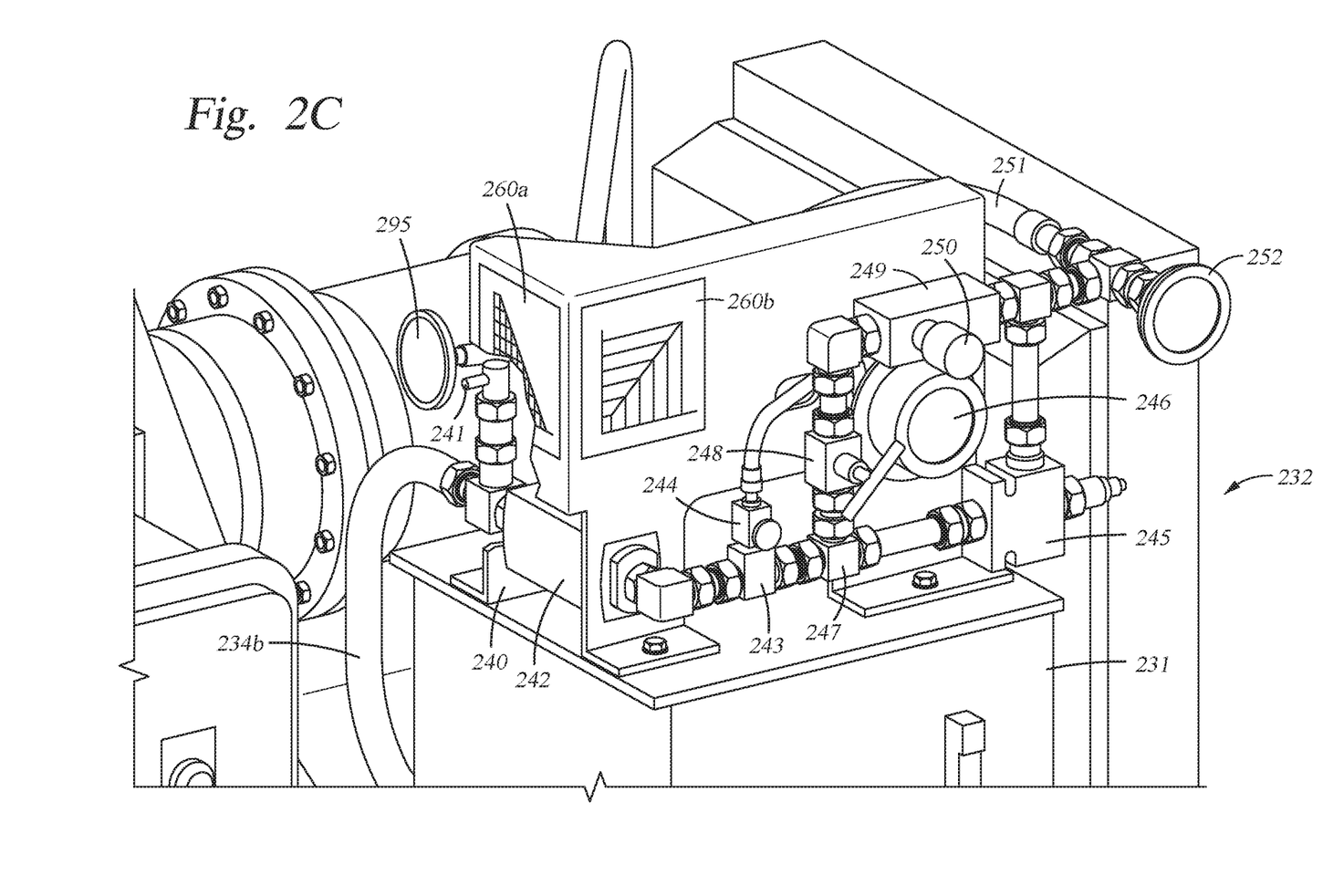
Figure 2D:
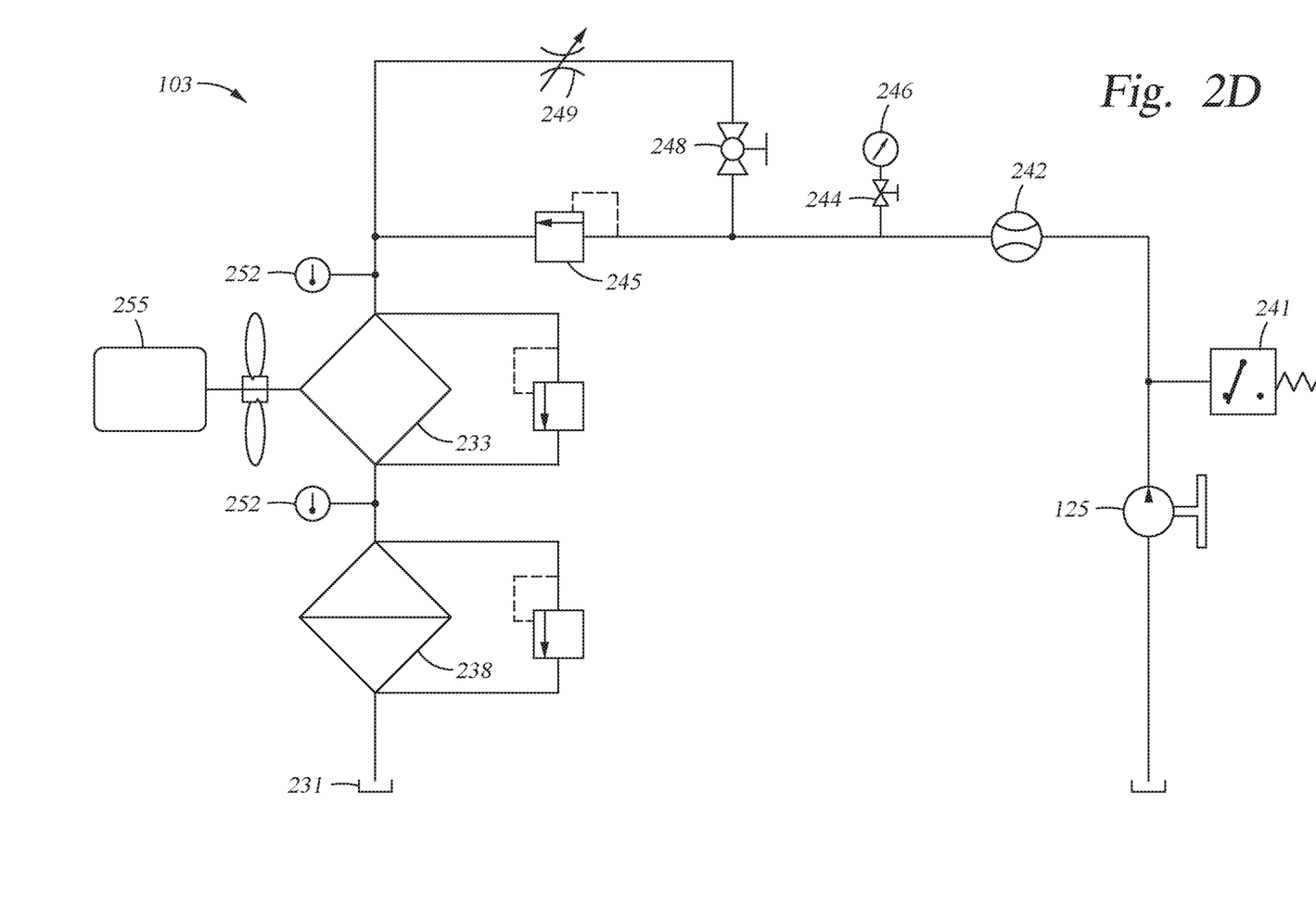

FIG. 2C illustrates a schematic perspective view of the speed control system 232. The speed control system 232 controls the flow rate of fluid 236 through the fluid system 103, and correspondingly, controls the rotational rate of the scroll 111. While speed control system 232 is illustrated as being located above the reservoir 231, other mounting locations are contemplated. The speed control system 232 receives fluid from a return line 234b at a first 3-way coupling 240. A first connection of the 3-way coupling is connected to the return line 234b, while a second connection is connected to a PSI switch 241. The PSI switch 241 may be configured to provide a contact to an alarm, to shut down feed to the decanter 102, to shut down the decanter 102, or to provide other safety related features. A third connection of the 3-way coupling is connected to flow meter 242. The flow meter 242 is configured to determine and/or display the volumetric flow of fluid 236 through the flow meter 242. In one example, the flow meter 242 is a 2 gallon per minute (GPM) to 20 GPM flow meter. Other sizes are also contemplated.

A second 3-way coupling 243 is located downstream of the flow meter 242 and receives fluid 236 therefrom. The second 3-way coupling 243 is further coupled to a gauge snubber 244 and a relief valve 245, each located downstream of the second 3-way coupling 243. The gauge snubber 244 is operable to dampen fluid pulses to a pressure meter 246. The relief valve 245 is configured to release pressure from the fluid system 103 in the event the fluid 236 exceeds a predetermined pressure. The varying flow rate is controlled by an adjustable mechanism which creates a control algorithm to adjust the scroll 111 to bowl 108 differential speed in response to system pressure changes. The control algorithm is achieved without electronics so control algorithm can be easily and economically incorporated into an explosion proof environment.

Alternatively, the flow control valve 249 may be configured to automatically adjust a flow orifice therein to vary the flow rate of fluid 236 through the speed control system 232 in response to varying pressures within the speed control system 232. It should be appreciated that fluid pressure created in the system provides an indicator of the load on the decanter 102 (shown in FIG. 1A). The fluid pressure may be provided to a control device as an analog or digital signal to facilitate electronic control of decanter operations. In one example, the fluid pressure signal may control differential speed between the scroll 111 and the bowl 108, or torque applied thereto. It should be appreciated that the other aspects of the separation system 100 may also be electronically controlled.

A third 3-way coupling 247 is located between the second 3-way coupling 243 and the relief valve 245. The third 3-way coupling directs downstream flow of the second 3-way coupling 243 to a valve 248. The valve 248 is operable to prevent or allow flow of fluid 236 through. When the valve 248 is open, flow of the fluid 236 is directed to a flow controller 249. The flow controller 249 is operable via a manually adjustable knob 250 to adjust the flow rate of fluid 236 therethrough. The flow rate through the flow controller 249 is pressure compensated so that flow does not vary with increases in pressure. The decreased flow rate within the fluid system 103 provides an increasing level of resistance against the adjustable speed brake 125 (See FIG. 2A). As the flow rate through the adjustable speed brake 125 decreases, it becomes more difficult for the adjustable speed brake 125 to rotate. The increased resistance to rotation of the adjustable speed brake 125 correspondingly results in decreased rotational speed of the adjustable speed brake 125. The decreased rotational speed of the adjustable speed brake 125 results in decreased rotational speed of the scroll 111 coupled thereto. Thus, the speed of the scroll 111 can be adjusted by changing flow rate of fluid 236 through the fluid system 103, which can be accomplished via adjustment of the flow controller 249. In one example, the flow controller 249 may be a manually adjustable valve, such as a throttle valve.

Fluid exiting the flow controller 249 is directed to a heat exchanger 233 via a conduit 251. An optional temperature gauge 252 may be positioned in line downstream of the flow controller 249 prior to the heat exchanger 233 to determine and/or display the temperature of the fluid 236 flowing therethrough. Referring back to FIG. 2B, fluid 236 travels through the conduit 251 and is delivered to the heat exchanger 233 at an upper end thereof. The fluid 236 travels downward through the heat exchanger 233, and exits the heat exchanger 233 into a conduit 290. The conduit 290 is further coupled to a hydraulic motor 253. The fluid traveling through the conduit 290 enters the hydraulic motor 253 and exits the hydraulic motor 253 into a conduit 254 which is connected to the reservoir 231. An optional temperature gauge 295 may be positioned in line with the conduit 254 to determine the temperature of the fluid 236 as the fluid 236 exits the heat exchanger. Optionally, the reservoir 231 may include a reservoir baffle (not shown) between fluid uptake and discharge regions. The reservoir baffle reduces waves and keeps the suction and discharge from short circuiting. A short circuit is when the discharge takes a direct path to the suction thus reducing retention time in the reservoir. Retention time allows the fluid to settle.

The flow of fluid 236 through the hydraulic motor 253 facilitates actuation of the hydraulic motor 253. Actuation of the hydraulic motor 253 drives a fan 255, which facilitates removal of heat from the fluid 236 as the fluid 236 travels through the heat exchanger 233. In such a manner, pressure induced by the adjustable speed brake 125 facilitates driving of the hydraulic motor 253, thereby improving system efficiency and mitigating the need for an additional power source to operate heat exchanging equipment with an electric motor.

To facilitate user operation of the separation system 100, the fluid system 103 includes one or more user reference guides 260a, 260b (two are shown) posted adjacent the speed control system 232. The user reference guides 260a, 260b provide information regarding the separation system 100 based on output of one or more sensors or gauges, such as the flow meter 242 and the pressure meter 246. In one example, the reference guide 260a is a graph which correlates flow rate measured by the flow meter 242 to the differential speed of the bowl 108 and the scroll 111. With this information, an operator can adjust the flow rate of the fluid 236 through the fluid system 103 via the speed control system 232 to obtain a desired differential speed.

The reference guide 260b is graph which correlates the pressure within the fluid system 103, as measured at the pressure meter 246, to the torque applied to the scroll 111. With such information an operator is able to determine the amount of torque applied to the scroll 111 during a separation operation, or is able to adjust the amount of torque applied to the scroll 111 by adjusting the flow, thereby affecting the pressure, within the fluid system via the flow controller 249. Adjustment of the torque on the scroll 111, or of the differential speed between the scroll 111 and the bowl 108, allows a maximum flow throughput through the decanter 102 to be achieved.

Benefits of the disclosure include simplified mechanisms for controlling the speed of the scroll in a decanter, and thus, for controlling the differential speed between the scroll and the bowl of the decanter. The utilization of an adjustable speed brake, such as a pump, is significantly less expensive than conventional speed control mechanisms, which may require additional motors and costly electronic speed control systems. In one example, it is contemplated that the speed control system of the present disclosure may be about 60 percent to about 90 percent less expensive than conventional speed control mechanisms.

In a first aspect of the disclosure, a separation system comprises a decanter comprising a bowl and scroll disposed within the bowl; a drive motor for rotating the bowl; a gearbox for transferring rotational motion of the bowl to the scroll; and an adjustable speed brake coupled to the gearbox, the adjustable speed brake configured to move a fluid through a fluid system comprising a flow controller, wherein a rotational speed of the scroll is adjustable in response to a change of fluid flow through the flow controller.

In another aspect, the adjustable speed brake is a pump. In another aspect, the pump is a positive displacement pump. In another aspect, a maximum fluid flow through the adjustable speed brake corresponds to a minimum differential speed between the bowl and the scroll. In another aspect, the flow controller is a manually adjustable valve. In another aspect, the fluid system further comprises a flow meter, a pressure gauge, and a temperature gauge. In another aspect, the fluid system further comprises a heat exchanger and a fan, and wherein fluid moved through the fluid system by the adjustable speed brake drives the fan. In another aspect, the fluid system comprises a reservoir. In another aspect, the fluid system is a closed system. In another aspect, the adjustable speed brake includes a pinion mechanically coupled to the gearbox. In another aspect, the fluid system includes a supply line and a return line coupled to the adjustable speed brake. It should be noted that the features of one, two, or more of these aspects may be combined with the separation system of said first aspect of the disclosure.

In a second aspect of the disclosure, a method of operating a separation system comprises driving a decanter with a drive motor, the drive motor driving a bowl of the decanter and a scroll of the decanter, the scroll being driven through a gearbox; and adjusting the differential speed between the bowl and the scroll, the adjusting comprising adjusting a flow rate of a fluid through a fluid system, the fluid driven by an adjustable speed brake coupled to the gearbox, wherein a rotational speed of the scroll is adjustable in response to a change of fluid flow through the flow controller.

In another aspect, the adjustable speed brake is a pump. In another aspect, the pump is a positive displacement pump. In another aspect, a maximum fluid flow through the adjustable speed brake corresponds to a minimum differential speed between the bowl and the scroll. In another aspect, the flow rate of the fluid through the system is adjusted via a manually adjustable valve. In another aspect, the fluid operates a hydraulic motor coupled to fan. In another aspect, the fan facilitates removal of heat from the fluid. It should be noted that the features of one, two, or more of these aspects may be combined with the method of said second aspect of the disclosure.

While the foregoing is directed to embodiments of the present disclosure, other and further embodiments of the disclosure may be devised without departing from the basic scope thereof, and the scope thereof is determined by the claims that follow.

What is claimed is:

1. A separation system, comprising:
   a decanter comprising a bowl and scroll disposed within the bowl;
   a drive motor for rotating the bowl;
   a gearbox for transferring rotational motion of the bowl to the scroll; and
   a closed loop fluid system, comprising:
   an adjustable speed brake coupled to the gearbox mechanically by a pinion, wherein actuation of the pinion moves a fluid through the closed loop fluid system through corresponding actuation of the adjustable speed brake;
   a variable flow valve through which fluid within the closed loop fluid system flows, the variable flow valve controlling a flow rate of the fluid through the closed loop fluid system by opening or closing of the valve, wherein a rotational speed of the scroll is adjustable in response to a change of fluid flow through the variable flow valve.

2. The separation system of claim 1, wherein the adjustable speed brake is a pump.

3. The separation system of claim 2, wherein the pump is a positive displacement pump.

4. The separation system of claim 1, wherein a maximum fluid flow through the adjustable speed brake corresponds to a minimum differential speed between the bowl and the scroll.

5. The separation system of claim 1, wherein the variable flow valve is a manually adjustable valve.

6. The separation system of claim 1, wherein the closed loop fluid system further comprises a flow meter, a pressure gauge, and a temperature gauge.

7. The separation system of claim 1, wherein the closed loop fluid system further comprises a heat exchanger and a fan, and wherein fluid moved through the closed loop fluid system by the adjustable speed brake drives the fan.

8. The separation system of claim 1, wherein the closed loop fluid system comprises a reservoir.

9. The separation system of claim 1, wherein the closed loop fluid system includes a supply line and a return line coupled to the adjustable speed brake.

10. A method of operating a separation system, comprising:
    driving a decanter with a drive motor, the drive motor driving a bowl of the decanter and a scroll of the decanter, the scroll being driven through a gearbox; and
    adjusting a differential speed between the bowl and the scroll, the adjusting comprising adjusting a flow rate of a fluid through a closed loop fluid system by adjusting a position of a variable flow valve through which the fluid of the closed loop system flows, the fluid driven by an adjustable speed brake in the closed loop fluid system, the adjustable speed brake coupled to the gearbox mechanically by a pinion, wherein a rotational speed of the scroll corresponds to the fluid flow through a variable flow valve.

11. The method of claim 10, wherein the adjustable speed brake is a pump.

12. The method of claim 11, wherein the pump is a positive displacement pump.

13. The method of claim 10, wherein a maximum fluid flow through the adjustable speed brake corresponds to a minimum differential speed between the bowl and the scroll.

14. The method of claim 10, wherein the variable flow valve is a manually adjustable valve.

15. The method of claim 10, wherein the fluid operates a hydraulic motor coupled to a fan.

16. The method of claim 15, wherein the fan facilitates removal of heat from the fluid.

17. The separation system of claim 1, wherein the bowl and the scroll are driven using only a single motor, the single motor being the drive motor.

18. The method of claim 10, wherein the bowl and the scroll are driven using only a single motor, the single motor being the drive motor.

* * * * *